United States Patent Office 2,900,366
Patented Aug. 18, 1959

2,900,366

RECOVERY OF COMPOUND 1,2,3,4,7,7-HEXA-CHLOROBICYCLO(2,2,1) - HEPTADIENE - 2,5 FROM HEXACHLOROCYCLOPENTADIENE-ACETYLENE REACTION PRODUCTS

George F. Johnson, Baytown, Clifford D. Marshall, Houston, and Richard H. Criswell, Pasadena, Tex., assignors to Shell Development Company, New York, N.Y., a corporation of Delaware No Drawing. Application October 17, 1957
Serial No. 690,612

10 Claims. (Cl. 260—648)

This invention relates to the separation of 1,2,3,4,7,7-hexachloro-bicyclo(2,2,1)-heptadiene-2,5 from mixtures comprising this material in admixture with hexachlorocyclopentadiene.

1,2,3,4,7,7-hexachloro-bicyclo(2,2,1)-heptadiene-2,5 is of importance as a starting or intermediate material in the production of valuable chemical derivatives therefrom. It is of particular importance in the preparation of insecticides. This material is now obtainable by the direct interaction of hexachlorocyclopentadiene with acetylene by methods such as, for example, those described and claimed in copending applications Serial No. 527,633, filed August 10, 1955, now U.S. Patent No. 2,813,915 and Serial No. 612,347, filed September 24, 1956. However, in the production of 1,2,3,4,7,7-hexachloro-bicyclo(2,2,1)-heptadiene-2,5 by the direct interaction of hexachlorocyclopentadiene with acetylene the desired compound is obtained in admixture with hexachlorocyclopentadiene. Often in the production of 1,2,3,4,7,7-hexachloro-bicyclo(2,2,1)-heptadiene-2,5 by such direct reaction of hexachlorocyclopentadiene with acetylene operating conditions are controlled to result in a reaction mixture containing the 1,2,3,4,7,7-hexachloro-bicyclo(2,2,1)-heptadiene-2,5 in admixture with relatively large amounts of hexachlorocyclopentadiene. 1,2,3,4,7,7-hexachloro-bicyclo(2,2,1)-heptadiene-2,5 is a normally liquid product having a boiling temperature of about 112° C. at 6 mm. Hg and a freezing temperature of about 0° C. Throughout this specification and attached claims the term "Compound A" is intended to mean the compound 1,2,3,4,7,7-hexachloro-bicyclo(2,2,1)-heptadiene-2,5. "Compound A" can be separated from the relatively close boiling hexachlorocyclopentadiene only with great difficulty in ordinary practical scale seperating means, such as, for example, conventional distillation equipment used in commercial operations. Furthermore, the yield of "Compound A" recovered, as well as its degree of purity is adversely affected to a serious extent by subjection to the conditions encountered in separating it as a kettle (bottoms) product from hexachlorocyclopentadiene.

The great need for a method enabling the more efficient separation of "Compound A" from admixture with hexachlorocyclopentadiene therefore becomes still more apparent when it is realized that, as the ratio of "Compound A" to hexachlorocyclopentadiene in the mixture increases the possibility of effecting a substantially complete separation between these components using ordinary practical scale distillation equipment becomes progressively more difficult and impractical. On the other hand the cost of equipment and of operation in carrying out the "Compound A"-producing hexachlorocyclopentadiene-acetylene reaction is reduced materially by carrying it out under conditions of low conversion, for example, with a conversion of hexachlorocyclopentadiene to "Compound A" of less than about 50%. Such more desirable method of producing "Compound A" results in the obtaining of the "Compound A" in admixture with substantial, often predominating amounts of hexachlorocyclopentadiene—that is, mixtures the resolution of which is not at all practical by distillation means ordinarily employed in plant operations.

It is therefore an object of the present invention to provide a process enabling the more efficient recovery of 1,2,3,4,7,7 - hexachlorobicyclo(2,2,1) - heptadiene - 2,5 ("Compound A") from mixtures comprising the "Compound A" in admixture with hexachlorocyclopentadiene.

A more particular object of the invention is the provision of an improved process enabling the more efficient recovery of "Compound A" from mixtures containing it in admixture with a substantial amount of hexachlorocyclopentadiene.

A still more particular object of the invention is the provision of an improved process enabling the more efficient separation of "Compound A" from reaction mixtures obtained by the direct reaction of hexachlorocyclopentadiene with acetylene. Other objects and advantages of the invention will become apparent from the following detailed description thereof:

In accordance with the present invention 1,2,3,4,7,7-hexachloro-bicyclo(2,2,1) - heptadiene - 2,5 ("Compound A") is separated with improved efficiency from mixtures containing it in admixture with hexachlorocyclopentadiene by the addition thereto of bicycloheptadiene, heating the resulting mixture to thereby selectively react bicycloheptadiene with hexachlorocyclopentadiene, and separating 1,2,3,4,7,7-hexachloro-bicyclo(2,2,1)-heptadiene-2,5 from the resulting reaction mixture.

It has now been found that bicycloheptadiene will react selectively with hexachlorocyclopentadiene upon heating in the presence of "Compound A" and that this does not adversely affect to any substantial degree the purity of the "Compound A" separated from the resulting reaction mixture. Furthermore, it has been found that the selective reaction of bicycloheptadiene with hexachlorocyclopentadiene in the presence of "Compound A," upon heating, results in the formation of a reaction mixture from which the "Compound A" is readily recoverable in a high state of purity and with high yields in ordinary practical scale distillation equipment.

Mixtures of "Compound A" with hexachlorocyclopentadiene, to the separation of which the process of the invention is applied, may be obtained from any source. The invention is applied with advantage to the reaction mixtures obtained in the manufacture of "Compound A" by the direct reaction of acetylene with hexachlorocyclopentadiene, for example, as described and claimed in copending applications Serial No. 527,633, filed August 10, 1955, and Serial No. 612,347, filed September 24, 1956.

In accordance with the invention bicycloheptadiene is added to the mixture comprising "Compound A" and hexachlorocyclopentadiene, in amounts which may vary within the scope of the invention depending upon specific conditions of operation used and the hexachlorocyclopentadiene content tolerated in the final recovered "Compound A." In order to effect a complete separation between "Compound A" and hexachlorocyclopentadiene the bicycloheptadiene is added in an amount equal to, or greater than, the stoichiometrical equivalent of hexachlorocyclopentadiene present in the mixture charged. It is preferred to add the bicycloheptadiene in substantial molecular excess with respect to the amount of hexachlorocyclopentadiene present. Thus, in the preferred method of carrying out the invention the bicycloheptadiene is added in an amount ranging, for example, from about one to about fifteen moles, and more preferably from about one to about five moles, of bicycloheptadiene per mole of hexachlorocyclopentadiene in the mixture charged. Greater or leser amounts of bicycloheptadiene may, however, be employed within the scope of the invention.

The resulting mixture comprising hexachlorocyclopentadiene, "Compound A" and bicycloheptadiene is subjected to conditions resulting in the interaction of hexachlorocyclopentadiene with the added bicycloheptadiene. Suitable conditions comprise the heating of the mixture at a temperature in the range of, for example, from about 50° to about 200° C., and more preferably from about 75° to about 125° C. The heating of the reaction mixture may be carried out at sub-atmospheric, atmospheric or super-atmospheric pressures. In general it is found that the use of a pressure in the range of from about atmospheric to about 350 p.s.i.g. is satisfactory. The time during which the mixture is maintained at the elevated temperature may vary within the scope of the invention depending upon the specific temperature and pressure used and the degree to which the recovered "Compound A" is to be free of hexachlorocyclopentadiene. A contact time ranging, for example, from about one-half to about thirty hours may be employed. In general, it is found that a contact time of about twenty hours need not be exceeded. Longer or shorter heating periods may however be employed within the scope of the invention. It is found that "Compound A" remains substantially unaffected during the heating period in the presence of the substantial amount of bicycloheptadiene.

Under the above-described conditions hexachlorocyclopentadiene and bicycloheptadiene will interact selectively in the presence of "Compound A" with the formation of a reaction mixture comprising 1,2,3,4,10,10-hexachloro-1,4,4a,5,8,8a - hexahydro - 1,4 - endo - exo - 5,8 - dimethano-naphthalene. This product is itself a valuable compound useful in the preparation of chemical derivatives therefrom and for use as an insecticide.

The reaction mixture resulting from the heating step will consist essentially of bicycloheptadiene, "Compound A" and 1,2,3,4,10,10-hexachloro-1,4,4a,5,8,8a-hexahydro-1,4-endo-exo-5,8-dimethano-naphthalene from which mixture "Compound A" is now readily separable by the use of available practical scale equipment. The invention is not limited to use of a specific method of recovering the "Compound A" from the mixture resulting from the heating of the charge in the presence of added bicycloheptadiene. Means comprising one or more such steps as, for example, distillation, extractive distillation, extraction, crystallization, adsorption, etc. may be employed within the scope of the invention.

In a preferred method of executing the process of the invention unreacted bicycloheptadiene is first removed from the mixture obtained by heating the charge with bicycloheptadiene. Separation of bicycloheptadiene from this mixture may be effected by any suitable means, for example, by flashing, equilibrium vaporization, etc. The bicycloheptadiene thus separated from the reaction mixture is returned to the reaction. In a preferred method of carrying out the process of the invention wherein an excess of bicycloheptadiene is employed a stream of bicycloheptadiene will cycle through the reaction and bicycloheptadiene vaporizing zones of the process.

The reaction mixture now freed of bicycloheptadiene consists essentially of "Compound A" and 1,2,3,4,10,10-hexachloro - 1,4,4a,5,8,8a - hexahydro - 1,4 - endo - exo-5,8-dimethano-naphthalene. These components are separated, for example, by one or more such steps as vacuum distillation, steam distillation, fractionation, etc. Thus the mixture may suitably be subjected to a fractionation under vacuum, preferably with introduction of steam as stripping aid into the fractionator bottoms. Conditions within the fractionating column are then controlled to effect the separation of a fractionator overhead consisting essentially of "Compound A" and steam from a bottoms fraction consisting essentially of 1,2,3,4,10,10-hexachloro - 1,4,4a,5,8,8a - hexahydro - 1,4 - endo - exo - 5,8-dimethano-naphthalene.

It is seen that the invention enables the recovery of the "Compound A" as an overhead product without having been subjected to the severe conditions unavoidably encountered when separating the material as a kettle product. The process of the invention thus enables the efficient separation of "Compound A" in a high state of purity and with unusually high yields from mixtures containing it in admixture with hexachlorocyclopentadiene, as evidenced by the following examples. This is done, furthermore, with the simultaneous formation of highly desirable 1,2,3,4,10,10-hexachloro-1,4,4a,5,8,8a-hexahydro - 1,4-endo - exo - 5,8 - dimethano - naphthalene as by-product. If desired, additional amounts of hexachlorocyclopentadiene taken from an outside source may be introduced into the system, for example, for the purpose of aiding in controlling the proportion of bicycloheptadiene circulated, or to convert such added hexachlorocyclopentadiene to additional amounts of 1,2,3,4, 10,10 - hexachloro - 1,4,4a,5,8,8a - hexahydro - 1,4 - endo-exo-5,8-dimethano-naphthalene during the process of "Compound A" separation.

The process of the invention may be carried out in batch, continuous or semi-continuous operation. Heating of the "Compound A"-hexachlorocyclopentadiene mixture in the presence of added bicycloheptadiene may be carried out in suitable reaction zones of enlarged cross-sectional area, such as, for example, reaction chambers, and the like, and/or in zones of restricted cross-sectional areas, such as, for example, externally heated tubular reactors, coils and the like. If desired, a plurality of reactors arranged in parallel or series flow may be used within the scope of the invention. Parts of equipment in direct contact with reactants may consist of metals and/or alloys capable of withstanding corrosive conditions. These comprise, for example, alloy steels, stainless steel, nickel, etc.

Atmospheric oxygen is preferably excluded to at least a substantial degree from the system. Means are, therefore, optionally provided to enable the introduction of inert gas, such as nitrogen, and the like, or a hydrocarbon vapor which is inert under the prevailing conditions, into the system.

The following examples are illustrative of the invention:

Example I

A mixture of 1,2,3,4,7,7 - hexachloro - bicyclo(2,2,1)-heptadiene - 2,5 and hexachlorocyclopentadiene, containing 40.7% by weight of 1,2,3,4,7,7 - hexachloro-bicyclo(2,2,1)-heptadiene-2,5 and 58.5% by weight of hexachlorocyclopentadiene, the rest consisting of high boiling organic impurities (obtained by the reaction of hexachlorocyclopentadiene with acetylene by the method described in copending application Serial No. 612,347, filed September 24, 1956), is introduced into a jacketed reactor provided with a stirrer. Bicycloheptadiene is introduced into the reactor in a quantity which provides a mole ratio of bicycloheptadiene to hexachlorocyclopentadiene of 3:1 in the total charge to the reactor. The reactor contents are heated at an initial temperature of 80° C. for one hour and then at 100° C. for twenty hours. Reactor effluence is analyzed and found to consist essentially of a mixture of 1,2,3,4,7,7-hexachloro-bicyclo(2,2,1) - heptadiene - 2,5 and 1,2,3,4,10,10 - hexachloro-1,4,4a,5,8,8a - hexahydro - 1,4 - endo - exo - 5,8 - dimethano-naphthalene and bicycloheptadiene containing no detectable amount of hexachlorocyclopentadiene. Bicycloheptadiene is separated from the reactor effluence by equilibrium vaporization and recycled to the reactor thereby leaving a bicycloheptadiene-free mixture containing 64.2% w. of 1,2,3,4,10,10 - hexachloro - 1,4,4a,5,8,8a-hexahydro - 1,4 - endo - exo - 5,8 - dimethano - naphthalene and 31.5% w. of 1,2,3,4,7,7-hexachloro-bicyclo-(2,2,1) - heptadiene - 2,5 (the rest being organic impurities) which is subjected to vacuum steam fractionation. 1,2, 3,4,7,7-hexachloro-bicyclo(2,2,1)-heptadiene-2,5 is taken off overhead from the fractionator as a final product. 1,2,3,4,10,10 - hexachloro-1,4,4a,5,8,8a - hexahydro - 1,4-endo-exo-5,8-dimethano-naphthalene is removed from the fractionator as bottoms. 97% of the 1,2,3,4,7,7-hexachloro-bicyclo(2,2,1)-heptadiene-2,5 in the charge to the process is recovered as 1,2,3,4,7,7-hexachloro-bicyclo(2,2,1)-heptadiene-2,5 of 99% purity as determined by infrared analysis. (The remaining 1% is found to consist essentially of 1,2,3,4,10,10-hexachloro-1,4,4a,5,8,8a-hexahydro-1,4-endo-exo-5,8-dimethano-naphthalene.) The 1,2,3,4,10,10 - hexachloro - 1,4,4a,5,8,8a - hexahydro - 1,4-endo-exo-5,8-dimethano-naphthalene withdrawn as fractionator bottoms is found to have a purity of 95% by infrared analysis (the remaining 5% consisting predominantly of 1,2,3,4,7,7 - hexachloro - bicyclo(2,2,1) - heptadiene - 2,5 and organic impurity).

*Example II*

The operation of the foregoing example is repeated under substantially identical conditions with the exception that a 1,2,3,4,7,7-hexachloro-bicyclo(2,2,1)-heptadiene-2,5-hexachlorocyclo-pentadiene mixture of different origin containing 37.7% w. of 1,2,3,4,7,7-hexachloro-bicyclo(2,2,1)-heptadiene-2,5 and 60.6% w. of hexachlorocyclopentadiene (the rest consisting essentially of organic impurities) is used as charge. Over 96% of the 1,2,3,4,7,7-hexachloro-bicyclo(2,2,1)-heptadiene-2,5 charged is recovered with a purity of 94.4% (the remaining 5.6% of the product consisting predominantly of bicycloheptadiene and 1,2,3,4,10,10-hexachloro-1,4,4a,5,8,8a-hexahydro-1,4-endo-exo-5,8-dimethano-naphthalene).

We claim as our invention:

1. The method of recovering 1,2,3,4,7,7-hexachlorobicyclo(2,2,1)-heptadiene-2,5 from mixtures containing 1,2,3,4,7,7 - hexachloro - bicyclo(2,2,1) - heptadiene - 2,5 in admixture with hexachlorocyclopentadiene which comprises, adding bicycloheptadiene to said mixture, heating the resulting mixture, thereby selectively reacting bicycloheptadiene with hexachlorocyclopentadiene, and separating 1,2,3,4,7,7 - hexachloro - bicyclo(2,2,1) - heptadiene-2,5 from the resulting reaction mixture.

2. The process in accordance with claim 1 wherein said bicycloheptadiene is added in an amount exceeding the stoichiometrical equivalent of the hexachlorocyclopentadiene in said mixture.

3. The process of recovering 1,2,3,4,7,7-hexachlorobicyclo(2,2,1)-heptadiene-2,5 from mixtures containing 1,2,3,4,7,7 - hexachloro - bicyclo(2,2,1) - heptadiene - 2,5 in admixture with hexachlorocyclopentadiene which comprises, adding bicycloheptadiene to said mixture in an amount exceeding the stoichiometrical equivalent of the hexachlorocyclopentadiene content of said mixture, heating the resulting mixture at a temperature of from about 50° to about 200° C., thereby selectively reacting bicycloheptadiene with hexachlorocyclopentadiene, and separating 1,2,3,4,7,7-hexachloro-bicyclo(2,2,1)-heptadiene-2,5 from the resulting reaction mixture.

4. The process in accordance with claim 3 wherein said heating is effected at a temperature in the range of from about 75° to about 125° C.

5. The process in accordance with claim 4 wherein said bicycloheptadiene is added in an amount resulting in a molar ratio of bicycloheptadiene to hexachlorocyclopentadiene in the range of from about 1:1 to 5:1.

6. The method of recovering 1,2,3,4,7,7-hexachlorobicyclo(2,2,1)-heptadiene-2,5 from a mixture containing 1,2,3,4,7,7-hexachloro-bicyclo(2,2,1) - heptadiene - 2,5 in admixture with hexachlorocyclopentadiene which comprises, adding bicycloheptadiene to said mixture in an amount exceeding the stoichiometrical equivalent of the hexachlorocyclopentadiene content of said mixture, heating the resulting mixture at a temperature in the range of from about 50° to about 200° C., continuing said heating until at least a substantial amount of said hexachlorocyclopentadiene has reacted with said bicycloheptadiene, and separating 1,2,3,4,7,7-hexachlorobicyclo-(2,2,1)-heptadiene-2,5 from the resulting reaction mixture.

7. The process in accordance with claim 6 wherein said bicycloheptadiene is added in an amount equal to from about one to about fifteen moles of bicycloheptadiene per mole of hexachlorocyclopentadiene in said mixture.

8. The process for separating 1,2,3,4,7,7-hexachlorobicyclo(2,2,1)-heptadiene-2,5 from a mixture containing 1,2,3,4,7,7-hexachloro-bicyclo(2,2,1) - heptadiene - 2,5 in admixture with hexachlorocyclopentadiene which comprises adding bicycloheptadiene to said mixture in an amount resulting in a mole ratio of bicycloheptadiene to hexachlorocyclopentadiene in the range of from about 1:1 to about 5:1 in said mixture, heating the resulting mixture at a temperature in the range of from about 75° to about 125° C., continuing said heating until at least a substantial amount of hexachlorocyclopentadiene has reacted with bicycloheptadiene, and separating 1,2,3,4,7,7-hexachloro-bicyclo(2,2,1)-heptadiene-2,5 from the resulting reaction mixture.

9. The process for recovering 1,2,3,4,7,7-hexachlorobicyclo(2,2,1)-heptadiene-2,5 from a mixture containing said 1,2,3,4,7,7-hexachloro-bicyclo(2,2,1)-heptadiene-2,5 in admixture with hexachlorocyclopentadiene which comprises adding to said mixture from about one to about five moles of bicycloheptadiene for each mole of hexachlorocyclopentadiene in said mixture, heating the resulting mixture at a temperature of from about 75° to about 125° C., continuing said heating until substantially all of said hexachlorocyclopentadiene has reacted with bicycloheptadiene, separating bicycloheptadiene from the resulting reaction mixture, and fractionally distilling 1,2,3,4,7,7-hexachloro-bicyclo(2,2,1)-heptadiene-2,5 free of any substantial amount of hexachlorocyclopentadiene from the bicycloheptadiene-free reaction mixture.

10. The process in accordance with claim 9 wherein bicycloheptadiene separated from said reaction mixture is recycled to said reaction.

References Cited in the file of this patent

UNITED STATES PATENTS

| | | |
|---|---|---|
| 2,635,977 | Lidov | Apr. 21, 1953 |
| 2,813,915 | Howald et al. | Nov. 19, 1957 |